June 19, 1923.
D. B. MORISON
CAP NUT
Filed Oct. 4, 1921
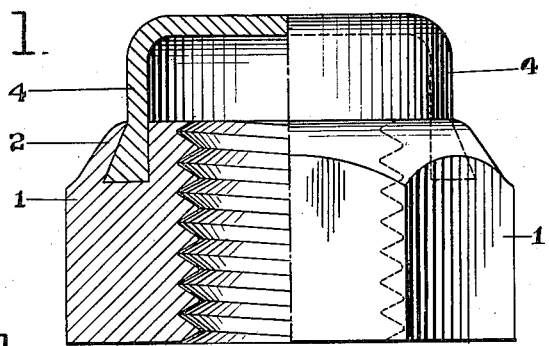
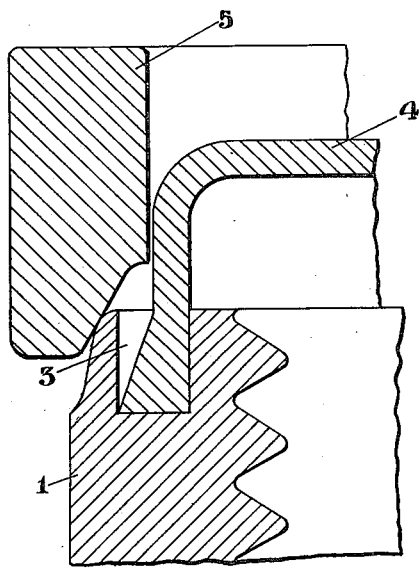 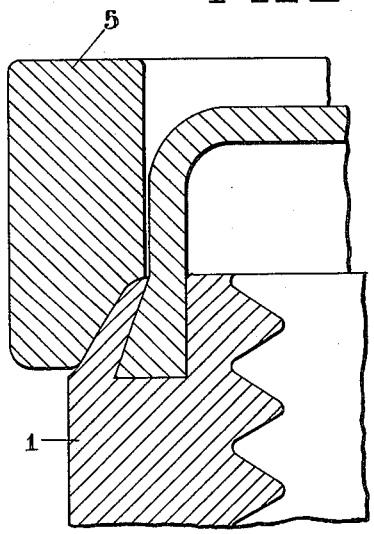
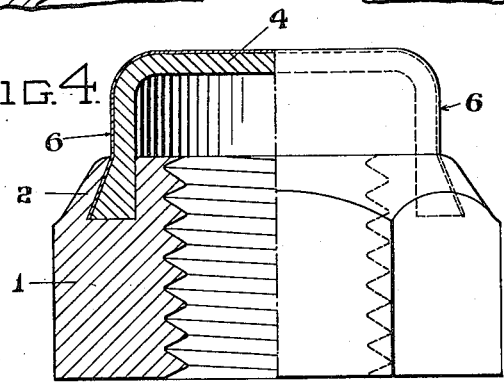
INVENTOR:
Donald B. Morison.
By Spear, Middleton, Donaldson & Hall
Attys.

Patented June 19, 1923.

1,459,548

UNITED STATES PATENT OFFICE.

DONALD BARNS MORISON, OF HARTLEPOOL, ENGLAND.

CAP NUT.

Application filed October 4, 1921. Serial No. 505,442.

*To all whom it may concern:*

Be it known that I, DONALD BARNS MORISON, a subject of the King of Great Britain and Ireland, residing at Hartlepool, in the county of Durham, England, have invented certain new and useful Improvements in Cap Nuts, of which the following is a specification.

This invention relates to cap nuts as used for threaded bolts and the like, that is to say, nuts having one end closed. Such nuts are usually constructed of solid metal, the cap being integral with the nut.

The invention consists broadly of a two part cap nut comprising a nut, a cap and a locking member adapted upon the application of pressure mechanically applied to become so repositioned or displaced as to integrally unite or interlock the nut and the cap.

In accordance with my invention or one form, I provide on the top of an open ended nut adjacent to the thread an upward extension. In this extension a groove is formed for receiving the cap, which may be a stamped hollow cap or may be a disc, the base of the cap if desirable being suitably shaped or enlarged to facilitate interlocking. A die being placed over the cap and resting on the outward lip of the groove is subjected to applied pressure as by a percussive blow with the effect that the lip is folded over the enlargement of the base of the cap, and together with the base of the cap completely fills the groove, whereby the cap and nut are integrally connected and constitute a complete cap nut as a whole. The outward lip of the groove is preferably so formed that when folded over it embodies a radius at its base and a top so shaped as to produce an effective junction with cap.

It will be understood that either or both parts, viz, the nut and the cap, may be otherwise suitably formed so that the interlocking is made effective by the mechanical displacement of metal resulting from pressure applied as above described or by spinning as in a lathe or in any other suitable way.

In the accompanying drawings I have illustrated the preferred embodiments of my invention, Fig. 1 being an elevational view partly in section of a cap nut constructed in accordance with the invention.

Fig. 2 a section to an enlarged scale illustrating the two members of the nut with the die in position ready for operation.

Fig. 3 is a similar view after the die has been operated.

Fig. 4 is a part sectional elevation of a nut illustrating how the cap may be provided with an ornamental veneer.

Referring to Figs. 1 to 3 of these drawings the numeral 1 designates the body portion or nut proper which is formed with an upstanding annular rim or flange 2 bordering an annular groove or recess 3 into which the separately formed cap 4 is arranged in the manner shown in Fig. 2. Upon the descent of the die 5 the flange 2 becomes mechanically repositioned or displaced from its original form to the position shown in Figs. 1 and 3, the pressure operating to ensure a practically homogeneous structure.

By means of the foregoing a homogeneous structure can be provided which will be leak proof under great pressure and which can be made more cheaply than heretofore, moreover, it enables the cap and the nut to be made of dissimilar metals, for example, the nut may be made of ordinary steel and the cap of rustless metal or material.

Nuts of the foregoing character—apart from other advantages—can be made very attractive in appearance by making the cap member of a metal different from that of the nut member. For example, a blued or heat treated nut with a nickel, duralminium, or other bright metal cap is very attractive and needs the minimum of labor to keep it clean. The use of these special metals wholly for the cap may, however, be expensive. An economical method of manufacturing such nuts which forms a feature of my invention consists in forming the nut member and the cap member of comparatively inexpensive metal and applying, as a veneer, to the cap member a thin covering member of the more expensive and attractive metal. A convenient arrangement is illustrated in Figs. 4 wherein the nut and the cap 4 are formed of steel and the cap is enclosed in a thin covering member 6 of nickel or the like. By this means an equally attractive nut is provided without the use of any considerable quantity of the expensive metal.

Moreover, the cap member may be an unmachined stamping in the condition in which it leaves the stamping machine and the veneer member may be pressed from polished sheet metal whereby the economical manufacture of the compound cap member is promoted.

What I claim and desire to secure by Letters Patent is:—

A cap nut, comprising a cap having an outwardly extending annular depending base of greater diameter than the body of the cap, a nut having an annular recess in which the depending base of the cap is positioned, said recess being bordered by a locking flange adapted to be mechanically repositioned over the extended base of the cap whereby the locking flange and the base of the cap are integrally interlocked.

In testimony whereof, I affix my signature.

DONALD BARNS MORISON.